United States Patent Office 3,543,386
Patented Dec. 1, 1970

3,543,386
METHOD OF METALLIZING BODIES MADE FROM CERAMICS OR CRYSTALLIZED GLASS AND METHOD OF PRODUCING A GAS TIGHT SEAL
Morio Inoue and Gota Kano, Suita-shi, Japan, assignors to Matsushita Electronics Corporation, Oaza Kadoma, Kadoma-shi, Osaka, Japan, a corporation of Japan
No Drawing. Filed Sept. 28, 1966, Ser. No. 582,510
Claims priority, application Japan, Sept. 28, 1965, 40/60,192
Int. Cl. B23k *3/02*
U.S. Cl. 29—473.1         3 Claims

ABSTRACT OF THE DISCLOSURE

A method of metallizing ceramic or crystallized glass in which a body having a surface composed of a material selected from the group consisting of any ceramic and crystallized glass is provided. A metal selected from the group consisting of molybdenum and tungsten is deposited on at least a portion of the body directly from vapor phase. A second body having a surface of any ceramic, any metal or crystallized glass may be attached to the metallized portion of the first body thereby providing a gas-tight seal. The metal deposition may be accomplished by hydrogen reduction of any halide or decomposition of any carbonyl compound.

---

The present invention relates to a method of metallizing bodies comprised of a ceramic or crystallized glass. More particularly, the present invention relates to a method of producing gas tight seals between a body comprised of a ceramic or crystallized glass and another body comprised of similar material or metal.

The present invention is particularly useful in connection with the manufacturing of such ceramic products as the electronic tube by adhering ceramics with ceramics, and ceramics with metals, and especially to a method for forming gas tight bond capable of withstanding high operating temperatures while maintaining a substantial mechanical strength on the sealed surfaces.

The methods of producing vacuum gas tight seal between ceramics and metals are a subject on which numerous studies have already been carried out, and these methods are now being put into practice.

By rough classification, there are three methods now being widely in use. They are the metal powder metallizing method, the active metal method and the hydride method.

It is an object of the present invention to provide a method of metallizing a body comprised of a ceramic or crystallized glass by depositing molybdenum or tungsten directly from vapor phase.

It is a further object of the present invention to provide a method of forming a gas tight seal between a body comprised of a ceramic or crystallized glass and another body or material.

The persent invention provides noticeable improvements in the metallizing method, especially the method of metal coating. In the so-called metal powder metallizing method the surface of a ceramic body is metallized with metal powders blended with powders of metallic molybdenum or tungsten as the main ingredient, and, thereafter, the ceramics and the metals are adhered by brazing.

In the conventional metal powder metallizing method, the metallic molybdenum or tungsten to be adhered is all used in powders suspended in orgnic solvents. Accordingly, it was very hard to adhere the afore-mentioned powdery metals on the fine irregular ceramic surface, for example, a surface having minute holes of 50μ diameter. Moreover, the baking in the metallizing method requires a hydrogen heat treatment to be carried out as at as high a temperature as 1300° C. to 1600° C.

The present invention eliminates the drawbacks described above, and makes it possible to metallize the surface of a body made from a ceramic material or crystallized glass even at low temperatures, and moreover, to produce the gas tight seal with ease but without fail.

One aspect of this invention is characterized in that a ceramic body is metallized by coating it with molybdenum or tungsten film through chemical deposition from its halides in vapor phase.

The molybdenum or tungsten, chemically deposited from its vapor phase, is very compact, and even if the ceramic surface is irregular, it closely adheres to the surface of the ceramic body, and continues to be so deposited. According to this method, the metallic molybdenum or tungsten film deposited on the surface of a ceramic body by hydrogen-reducing the halides of said metals, for example, molybdenum pentachloride or tungsten hexachloride. The process tends to deposit said metals through decomposition of the halides at above about 500° C. temperature in an inert gas under 1 atmospheric or reduced pressure.

The molybdenum film or tungsten film can also be deposited on the surface of a ceramic body from vapor phase through decomposition from such compounds as carbonyl, for example Mo(CO)$_6$, in place of the aforementioned halides of molybdenum or tungsten.

In the following passages, the present invention is explained by several examples.

EXAMPLE 1

Hydrogen was flown at the flow rate of 1 litre per minute on molybdenum pentachloride powders held at 100° C. The mixed gas of molybdenum pentachloride and hydrogen was led to the surface of ceramic body held at 500° C. to deposit the molybdenum on the ceramic surface. A strong metallized surface was obtained.

The chemical reaction at this time follows the equation: $MoCl_5 + 5/2H_2 \rightarrow Mo + 5HCl$. The temperature of the ceramic surface at which the metallic molybdenum is produced by reduction from molybdenum pentachloride as indicated by the above-mentioned reaction and is subsequently deposited on the ceramic surface, is required to be at least about 500° C. The higher the temperature of the ceramic surface, the more strengthened the bond between the ceramic surface and the metal will be.

By the above-described method, molybdenum was deposited to the depth of 0.5μ on a cross section of a ceramic tube 15 mm. in diameter, 20 mm. long, and 1 mm. thick, being held at 500° C., and this tube was silver-brazed to a copper tube with the same dimensions. The produced seal was able to keep vacuum gas-tightness at 10$^{-8}$ mm. Hg.. Furthermore, the above-mentioned seal, joining the ceramic tube and the copper tube, could bear the thermal shock, as it was quenched from 800° C. to 0° C.

Besides the above-mentioned 500° C., the temperature of the ceramic tube at deposit reaction, the experiment was conducted at 800° C. and at 1000° C. Good results were obtained similar to the above instance.

EXAMPLE 2

Hydrogen was flown at the flow rate of 1 litre per minute on tungsten hexachloride powders held at 150° C. The mixed gas of tungsten hexachloride gas and hydrogen was led to the ceramic surface held at 900° C. to deposit tungsten on the ceramic surface. A strong metallized surface was obtained.

The chemical reaction taking place at this time is represented by $WCl_6 + 3H_2 \rightarrow W + 6HCl$. The temperature of the ceramic surface at which, as indicated by the above-mentioned reaction, tungsten hexachloride is reduced into metallic tungsten, and is deposited on the ceramic surface, is required to be at least about 500° C. as is the case of Example 1. The higher the temperature of the ceramic surface, the more strengthened the bond between the ceramic surface and the metal will be.

Tungsten was deposited to the depth of $0.5\mu$ by the method described above on a cross section of a ceramic tube 15 mm. in diameter, 20 mm. long and 1 mm. thick, being held at 900° C., and this tube was silver-brazed to a copper tube with identical dimensions. The seal produced in this way was able to keep vacuum gas-tightness at $10^{-8}$ mm. Hg. Furthermore, the seal joining the above-mentioned ceramic tube and the copper tube could bear the thermal shock as it was quenched from 800° C. to 0° C.

EXAMPLE 3

Molybdenum was deposited through heat decomposition from molybdenum carbonyl vaporized by heating at 200° C. on a surface of ceramic plate held at 500° C. in a vacuum container. A strong metallized surface was obtained. The decomposition occurred at this time according to the following equation:

$$Mo(CO)_6 \rightarrow Mo + 6CO$$

The temperature, at which molybdenum carbonyl is decomposed by heat into metallic molybdenum in the indicated manner, and which is subsequently deposited on the ceramic, is required to be above about 500° C. In this instance, the higher the temperature of the ceramic surface, the more strengthened the bond between the ceramic surface and the metal will be.

Molybdenum was deposited by the method described above the depth of $0.5\mu$ on a cross section of a ceramic tube, 15 mm. in diameter, 20 mm. long and 1 mm. thick, being held at 500° C., and this tube was silver-brazed to a copper tube with identical dimensions. The seal produced in this way was able to keep vacuum gas-tightness at $10^{-8}$ mm. Hg. Furthermore, the above-mentioned seal, joining the ceramic tube and the copper tube, could bear the thermal shock as it was quenched from 800° C. to 0° C.

EXAMPLE 4

Tungsten was deposited through heat decomposition from tungsten carbonyl vaporized by heating at 200° C. on a surface of ceramic plate held at 500° C. in a vacuum container. A strong metallized surface was obtained. The decomposition taking place at this time follows the following equation: $W(CO)_6 \rightarrow W + 6CO$.

The temperature of the ceramic surface, at which metallic tungsten is produced through heat decomposition from tungsten carbonyl and which is then deposited on the ceramic, is required to be above about 500° C. The higher the temperature of the ceramic surface, the more strengthened is the bond between the ceramic surface and the metal will be.

Tungsten was deposited according to the method described above on a cross section of a ceramic tube 15 mm. in diameter, 20 mm. long and 1 mm. thick, being held at 500° C., to the depth of $0.5\mu$ by the method described above, and this tube was then silver-brazed to a copper tube with identical dimensions. The seal produced in this way was able to keep vacuum gas-tightness at $10^{-8}$ mm. Hg. Furthermore, the seal, joining the above-mentioned ceramic tube and the copper tube, could withstand the thermal shock as it was quenched from 800° C. to 0° C.

The ceramics mentioned in the examples described above include concretely such various ceramics as alumina, zirchonia, forsterite, cordierite, berylia, and the like. When metals were deposited on these ceramics by the same method as used in each of examples mentioned above, metallized surfaces strong thermally as well as mechanically were obtained. For crystallized glass in place of ceramic, the method of this invention was also effective.

It is one of the outstanding special features of this invention that, according to this invention, as clearly seen in the examples described above, compact metal film is deposited at such a low temperature as 500° C., at which metallizing and sealing could not be produced by the usual metal powder metallizing method, and, in the course of deposition, a strong metallized surface is produced at the same time.

It is further to note that, when the ceramic or crystallized glass, metallized at 500° C. by the method described above is subjected to hydrogen heat treatment at higher temperatures, a still stronger metallized surface is obtained. However, this process may be omitted in producing a seal strong enough to stand use.

The rate of deposition of the metal film from halides in this invention is freely adjustable by varying the rate of flow of hydrogen and the amount of the halide, and the rate of deposition of the metal film from carbonyl compounds is also freely adjustable by altering the vapor pressure, the rate, in either case, being controllable within the range of $0.1\mu/min.$ to $10\mu/min.$ For example, in order to attach a copper piece as, for example, a lead wire or the like to the strong metallized surface obtained by subjecting a ceramic metallized at 500° C. as described above, the metallized surface is subjected to hydrogen heat treatment at 80° C., the $0.5\mu$ thick metal film metallized on the ceramic is copper-plated by the conventional well-known method, and the film, together with the ceramic, is put in a hydrogen furnace held at 500° C., and subjected to heat treatment for 5 minutes. On this copper-plated surface, other copper pieces such as a lead wire or the like may be soldered with ease and without fail.

The bonding between the ceramic and the copper produced in the example mentioned above is strong, mechanically as well as thermally, and is strong enough to serve as gas-tight seal under vacuum.

A small electron tube made on trial in application of this invention, was able to keep the degree of vacuum at $10^{-8}$ mm. Hg.

The example described above covers only the bonding between the ceramic and a copper piece. This aspect of the method of this invention is not so limited, but also relates to the bonding between ceramics or crystallized glass and other metals. It is also applicable to and effective for the gas-tight sealing between ceramics of different types. Thus, it is the special feature of this invention, taking advantage of the chemical deposition from vapor phase, that ceramics with fine intricate surface and crystallized glass may be metallized without difficulty with molybdenum or tungsten.

If optically ground ceramics are used as the ceramic in application of this invention, molybdenum or tungsten film having very smooth and uniformly thick mirror surface will be obtained. In this way, the tooling precision of the material to be bonded is improved. Besides, if the photo-resist etching method is employed in combination with the present invention, ceramic printed circuit boards with very fine sealed parts can be produced.

Although the present invention has been described with reference to particular examples, nevertheless, various changes and modifications obvious to those skilled in the art are deemed to be within the spirit, scope, and contemplation of the invention. It is, therefore, intended that the invention be limited by the scope of the appended claims.

We claim:

1. A method of producing a gas-tight seal between a ceramic or crystallized glass and a metal, which comprises:

(i) depositing on a surface of the ceramic or crystallized glass maintained at a temperature above 500° C. a metallic film or molybdenum or tungsten in the vapor phase by either:
  (a) the reduction of a halide of molybdenum or tungsten with hydrogen; or
  (b) the thermal decomposition of a carbonyl compound of molybdenum or tungsten thereby metallizing said surface to a thickness of less than $0.5\mu$, and
(ii) brazing the thus metallized portion to said metal.

2. The method of claim 1, wherein the molybdenum or tungsten is deposited and subsequently metallized on said surface by said reduction step (a).

3. The method of claim 1, wherein the molybdenum or tungsten is deposited and subsequently metallized on said surface by said thermal decomposition step (b).

References Cited

UNITED STATES PATENTS

| | | | |
|---|---|---|---|
| 2,776,472 | 1/1957 | Mesick | 29—473.1 |
| 3,371,406 | 3/1968 | Bronnes | 29—501 X |

OTHER REFERENCES

The Formation of Metallic Coatings by Vapor-Phase Techniques, Metal Finishing, vol. 50, No. 4, pages 64–69, April 1952.

JOHN F. CAMPBELL, Primary Examiner

R. B. LAZARUS, Assistant Examiner

U.S. Cl. X.R.

117—107.2